(12) United States Patent  
Sanders et al.

(10) Patent No.: US 9,200,341 B1  
(45) Date of Patent: Dec. 1, 2015

(54) SYSTEMS AND METHODS OF CAVITATION PEENING A WORKPIECE

(71) Applicant: The Boeing Company, Huntington Beach, CA (US)

(72) Inventors: Daniel Gordon Sanders, Cle Elum, WA (US); Hali T. Diep, Renton, WA (US); McKay Alma Kunz, Buckley, WA (US); Timothy Barber, Seattle, WA (US); Gregory L. Ramsey, Seabeck, WA (US); James B. Castle, Rolla, MO (US); Colton Reid Culbertson, Tukwila, WA (US); Long Ly, Seattle, WA (US)

(73) Assignee: The Boeing Company, Chicago, IL (US)

( * ) Notice: Subject to any disclaimer, the term of this patent is extended or adjusted under 35 U.S.C. 154(b) by 17 days.

(21) Appl. No.: 14/334,936

(22) Filed: Jul. 18, 2014

(51) Int. Cl.  
*B21D 26/02* (2011.01)  
*C21D 7/06* (2006.01)  
*B23P 9/04* (2006.01)  
*B21D 26/06* (2006.01)  
*C22F 3/00* (2006.01)  
*C21D 1/09* (2006.01)

(52) U.S. Cl.  
CPC *C21D 7/06* (2013.01); *B21D 26/02* (2013.01); *B21D 26/06* (2013.01); *B23P 9/04* (2013.01); *C21D 1/09* (2013.01); *C22F 3/00* (2013.01)

(58) Field of Classification Search  
CPC ............ C21D 1/09; C21D 7/06; B21D 26/02; B23P 9/04; C22F 3/00  
See application file for complete search history.

(56) References Cited

U.S. PATENT DOCUMENTS

| | | | |
|---|---|---|---|
| 6,855,208 B1 | 2/2005 | Soyama | |
| 2013/0074561 A1* | 3/2013 | Alberts | B21D 26/02 72/53 |
| 2013/0233040 A1* | 9/2013 | Butler | C21D 7/06 72/56 |
| 2013/0263635 A1 | 10/2013 | Barth et al. | |
| 2014/0208861 A1* | 7/2014 | Ehinger | G01N 3/02 73/788 |
| 2015/0039268 A1* | 2/2015 | Soyama | B05B 1/00 702/182 |

* cited by examiner

*Primary Examiner* — David B Jones  
(74) *Attorney, Agent, or Firm* — Armstrong Teasdale LLP

(57) ABSTRACT

A method of cavitation peening a workpiece is provided. The method includes discharging a flow of fluid towards the workpiece at a pressure and a flow rate that facilitates forming a plurality of cavitation bubbles, monitoring a feedback parameter associated with the plurality of cavitation bubbles, and determining a peening intensity of the plurality of cavitation bubbles based at least partially on a value of the feedback parameter.

20 Claims, 4 Drawing Sheets

SYSTEMS AND METHODS OF CAVITATION PEENING A WORKPIECE

BACKGROUND

The field of the present disclosure relates generally to cavitation and, more specifically, to systems and methods of cavitation peening with improved process controls.

Cavitation refers to a rapid formation and collapse of vapor pockets (i.e., bubbles) in a fluid such as water, for example. Cavitation generally occurs when the fluid is subjected to rapid decreases and subsequent increases in pressure. Because cavitation bubble collapse creates an implosion and corresponding intense shockwave, cavitation is currently being explored as an alternative mechanism to traditional peening processes, such as shot peening and laser shock peening, for use in imparting compressive residual stress to a workpiece. At least some known cavitation peening systems include a fluid nozzle, wherein the formation of cavitation bubbles that impinge against the workpiece is facilitated via pressure and fluid flow rate control of fluid discharged from the fluid nozzle. However, in at least some known technical applications, the workpiece must have predetermined levels of compressive residual stress before being placed into service. As such, more robust process controls for cavitation peening may be required to ensure the predetermined levels of compressive residual stress are satisfied.

BRIEF DESCRIPTION

In one aspect, a method of cavitation peening a workpiece is provided. The method includes discharging a flow of fluid towards the workpiece at a pressure and a flow rate that facilitates forming a plurality of cavitation bubbles, monitoring a feedback parameter associated with the plurality of cavitation bubbles, and determining a peening intensity of the plurality of cavitation bubbles based at least partially on a value of the feedback parameter.

In another aspect, a cavitation peening system for use in peening a workpiece is provided. The system includes a fluid delivery system including a fluid nozzle configured to discharge a flow of fluid therefrom, wherein the flow of fluid is discharged at a pressure and a flow rate that facilitates forming a plurality of cavitation bubbles to be directed towards the workpiece. The system also includes a feedback system including at least one feedback device configured to monitor a feedback parameter associated with the plurality of cavitation bubbles and a controller in communication with the at least one feedback device. The controller is configured to receive a value of the feedback parameter from the at least one feedback device and determine a peening intensity of the plurality of cavitation bubbles based at least partially on the value of the feedback parameter.

In yet another aspect, a feedback system for use with a cavitation peening system is provided. The feedback system includes at least one feedback device configured to monitor a feedback parameter associated with a plurality of cavitation bubbles formed by the cavitation peening system and a controller in communication with the at least one feedback device. The controller is configured to receive a value of the feedback parameter from the at least one feedback device and determine a peening intensity of the plurality of cavitation bubbles based at least partially on the value of the feedback parameter.

DETAILED DESCRIPTION

The implementations described herein relate to systems and methods of cavitation peening a workpiece to obtain quantifiable surface and sub-surface residual stresses. In the exemplary implementation, the system includes a fluid delivery system and a feedback system that monitors and selectively controls operation of the fluid delivery system. For example, the feedback system includes a plurality of feedback devices that monitor values of a variety of parameters associated with the formation and/or subsequent implosion of cavitation bubbles formed by the fluid delivery system. The peening intensity of the cavitation bubbles impinging against the workpiece is determined based on the feedback received from the plurality of feedback devices. As such, implementing the feedback system described herein enables a cavitation peening system to closely monitor the peening intensity to ensure a predetermined amount of compressive residual stress and surface enhancement is imparted to the workpiece.

Figure 1:
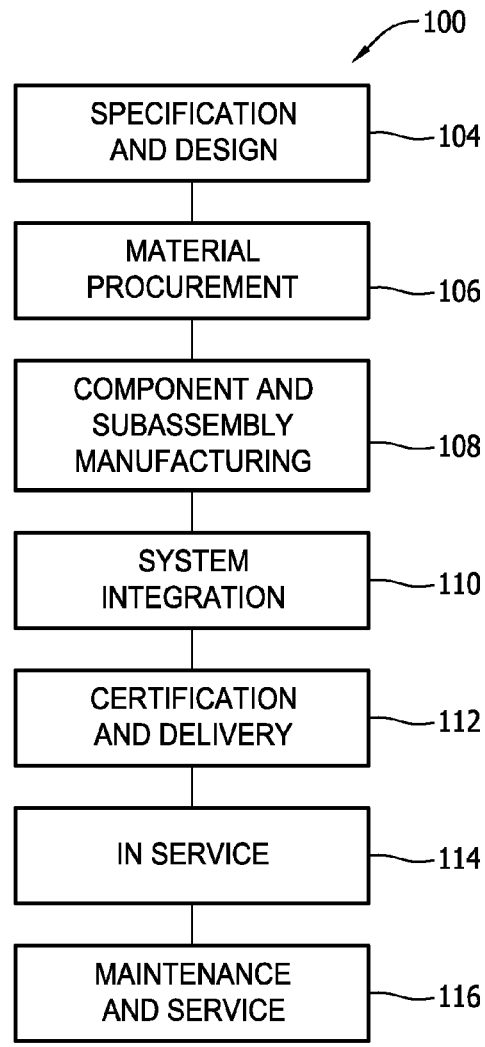
FIG. 1 is a flow diagram of an exemplary aircraft production and service method.
Figure 2:
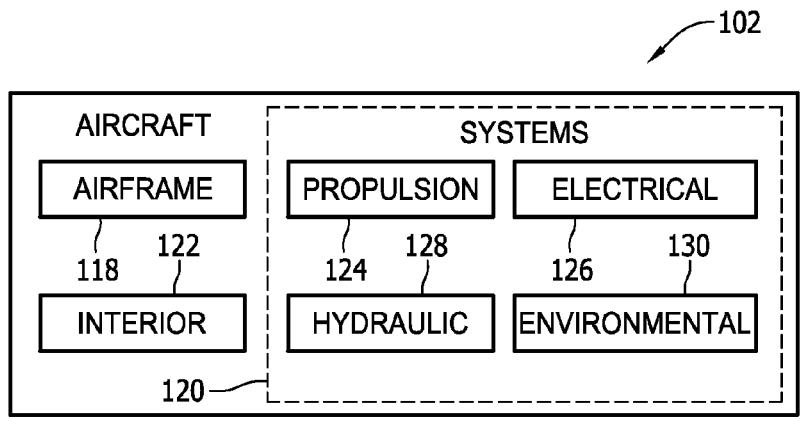
FIG. 2 is a block diagram of an exemplary aircraft.

Referring to the drawings, implementations of the disclosure may be described in the context of an aircraft manufacturing and service method 100 (shown in FIG. 1) and via an aircraft 102 (shown in FIG. 2). During pre-production, including specification and design 104 data of aircraft 102 may be used during the manufacturing process and other materials associated with the airframe may be procured 106. During production, component and subassembly manufacturing 108 and system integration 110 of aircraft 102 occurs, prior to aircraft 102 entering its certification and delivery process 112. Upon successful satisfaction and completion of airframe certification, aircraft 102 may be placed in service 114. While in service by a customer, aircraft 102 is scheduled for periodic, routine, and scheduled maintenance and service 116, including any modification, reconfiguration, and/or refurbishment, for example. In alternative implementations, manufacturing and service method 100 may be implemented via vehicles other than an aircraft.

Each portion and process associated with aircraft manufacturing and/or service 100 may be performed or completed by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 2, aircraft 102 produced via method 100 may include an airframe 118 having a plurality of systems 120 and an interior 122. Examples of high-level systems 120 include one or more of a propulsion system 124, an electrical system 126, a hydraulic system 128, and/or an environmental system 130. Any number of other systems may be included.

Apparatus and methods embodied herein may be employed during any one or more of the stages of method 100. For example, components or subassemblies corresponding to component production process 108 may be fabricated or manufactured in a manner similar to components or subassemblies produced while aircraft 102 is in service. Also, one or more apparatus implementations, method implementations, or a combination thereof may be utilized during the production stages 108 and 110, for example, by substantially expediting assembly of, and/or reducing the cost of assembly of aircraft 102. Similarly, one or more of apparatus implementations, method implementations, or a combination thereof may be utilized while aircraft 102 is being serviced or maintained, for example, during scheduled maintenance and service 116.

As used herein, the term "aircraft" may include, but is not limited to only including, airplanes, unmanned aerial vehicles (UAVs), gliders, helicopters, and/or any other object that travels through airspace. Further, in an alternative implementation, the aircraft manufacturing and service method described herein may be used in any manufacturing and/or service operation.

Figure 3:
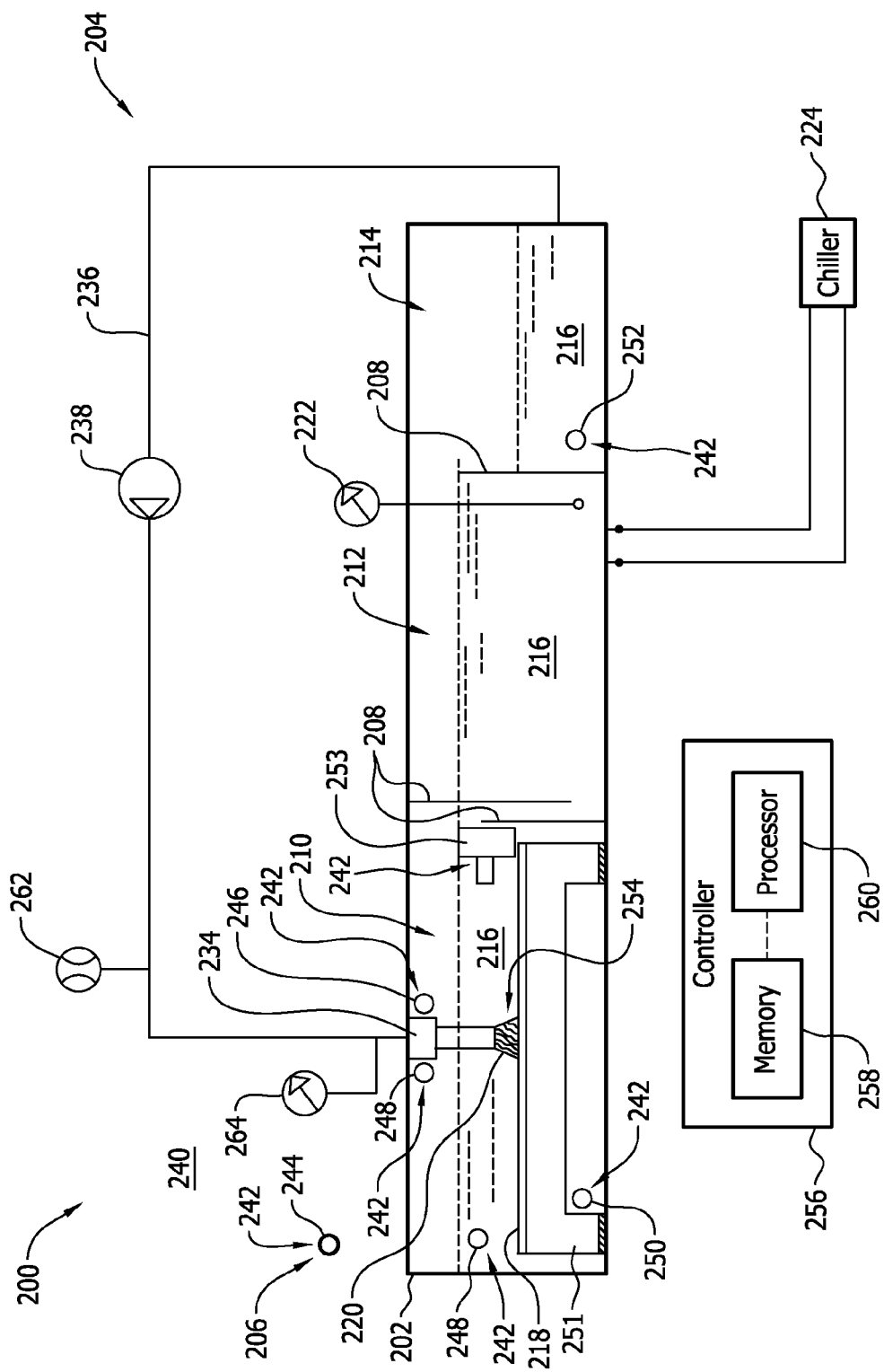
FIG. 3 is a schematic illustration of an exemplary cavitation peening system.
Figure 4:
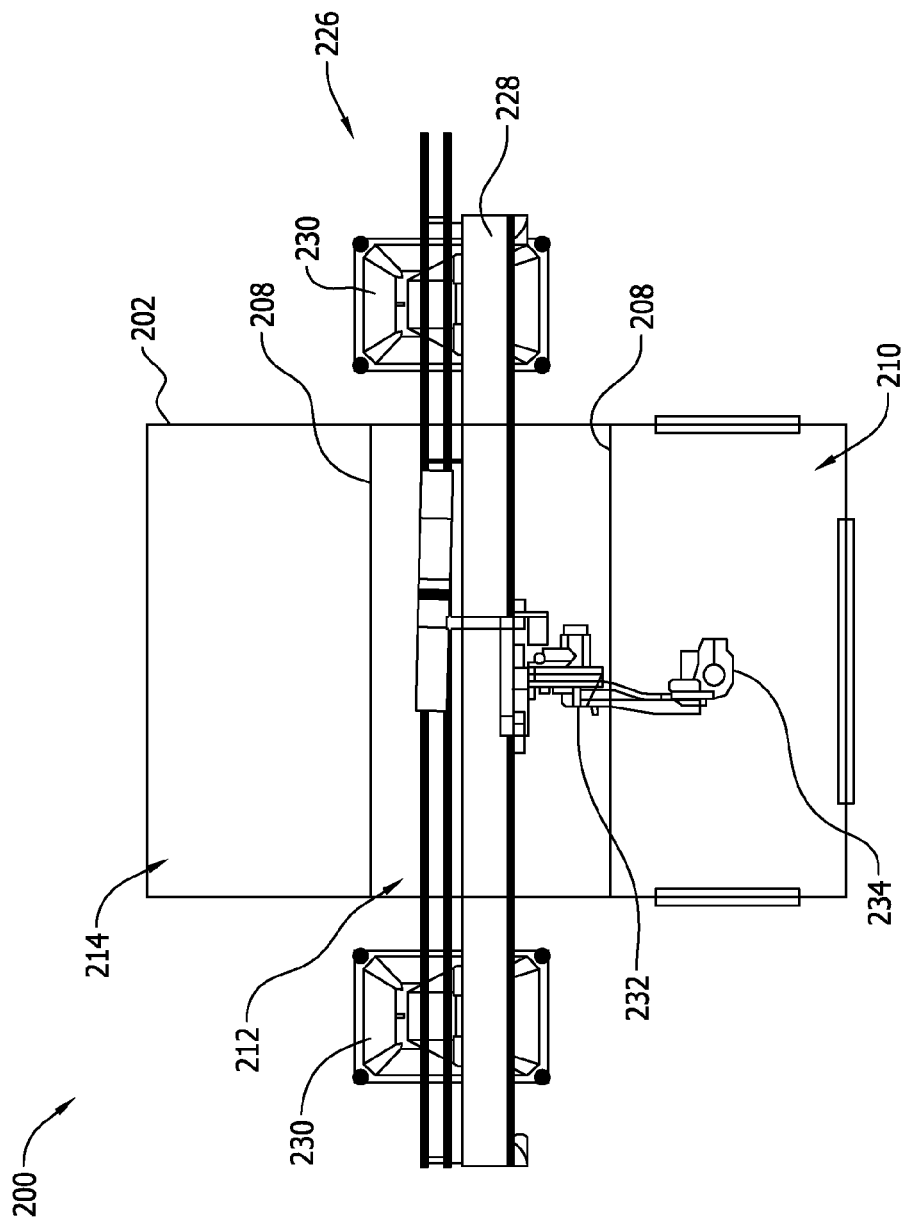
FIG. 4 is a schematic top view of the cavitation peening system shown in FIG. 3.

FIG. 3 is a schematic illustration of an exemplary cavitation peening system 200, and FIG. 4 is a schematic top view of cavitation peening system 200. In the exemplary implementation, cavitation peening system 200 includes a fluid reservoir 202, a fluid delivery system 204, and a feedback system 206. Fluid reservoir 202 includes a plurality of dividers 208 positioned therein to define a catch tank 210, a reservoir tank 212, and a feed tank 214 in fluid reservoir 202. Each tank 210, 212, and 214 includes a quantity of fluid 216, such as water, alcohol, glycol, hydrogenated oil, petroleum fluid, alkaline fluid, acidic fluid, and combinations thereof.

Catch tank 210 is sized to receive a workpiece 218, and the quantity of fluid 216 in catch tank 210 is selected to ensure workpiece 218 is submerged in fluid 216. Reservoir tank 212 facilitates controlling a temperature of fluid 216 in fluid reservoir 202 to ensure cavitation bubbles 220 form correctly in fluid 216, as will be described in more detail below. The temperature of fluid 216 is controlled with a temperature sensor 222 that determines a temperature of fluid 216 within reservoir tank 212, and a chiller 224 coupled in flow communication with reservoir tank 212 that draws, cools, and recycles fluid 216 in reservoir tank 212. Feed tank 214 facilitates providing fluid 216 for fluid delivery system 204.

Referring to FIG. 4, fluid delivery system 204 includes a gantry-based computer numerical controlled (CNC) machine 226 that includes a gantry 228 coupled to moveable platforms 230, and an end effector 232 coupled to gantry 228. A fluid nozzle 234 is coupled to end effector 232, and end effector 232 operates such that at least a portion of fluid nozzle 234 is submerged in fluid 216 within catch tank 210. Referring again to FIG. 3, fluid delivery system 204 also includes a fluid delivery conduit 236 coupled between fluid nozzle 234 and feed tank 214, and a pump 238 coupled in flow communication with fluid delivery conduit 236.

In operation, pump 238 draws fluid 216 from feed tank 214 and pumps the fluid at a predetermined pressure and flow rate to fluid nozzle 234. Fluid nozzle 234 then discharges the flow of fluid at the predetermined pressure and the predetermined flow rate to facilitate forming a plurality of cavitation bubbles 220 in fluid 216 within catch tank 210. As will be described in more detail below, cavitation bubbles 220 are directed towards workpiece 218 to facilitate imparting compressive residual stress thereto. In an alternative implementation, cavitation peening system 200 is configured such that workpiece 218 is exposed to an ambient environment 240, and fluid nozzle 234 discharges co-flows of fluid at differing pressures and/or flow rates to facilitate forming cavitation bubbles 220.

Feedback system 206 includes at least one feedback device 242 that monitors values of a feedback parameter associated with cavitation bubbles 220. For example, in operation, the formation and subsequent implosion of cavitation bubbles 220 is a dynamic and powerful process. As such, as will be described in more detail below, a value of one or more feedback parameters associated with cavitation bubbles 220 may be measured and used to determine a peening intensity of cavitation bubbles 220 impinging against workpiece 218. Exemplary feedback parameters include, but are not limited to, a sound level, a noise frequency, a vibration frequency, an amount of force, an amount of oxygen, and visual feedback associated with cavitation bubble production.

In the exemplary implementation, feedback devices 242 include an ambient noise sensor 244, an ultrasonic noise sensor 246, an ultrasonic vibration sensor 248, a dynamometer 250, an oxygen sensor 252, and a visual feedback device 253. Ambient noise sensor 244 is positioned in ambient environment 240 and located a predetermined distance from fluid reservoir 202. Ambient noise sensor 244 measures a sound level originating from fluid reservoir 202. Ultrasonic noise sensor 246 is coupled to fluid nozzle 234 such that ultrasonic noise sensor 246 remains in close proximity to the formation of cavitation bubbles 220. Predetermined ranges of frequencies correspond to cavitation, and ultrasonic noise sensor 246 measures a noise frequency originating from cavitation bubbles 220 impinging against workpiece 218.

Ultrasonic vibration sensor 248 is located close to workpiece 218 within bath 216, and facilitates monitoring characteristics of a shock wave (not shown) generated by cavitation bubbles 220. The characteristics of the shock wave facilitate determining an amount of compressive stress induced below the surface of workpiece 218. Dynamometer 250 is coupled to a bracket 251 holding workpiece 218, and measures an amount of force induced to workpiece 218 in three dimensions when cavitation bubbles 220 impinge shock wave forces against workpiece 218, which is held in place by bracket 251. Alternatively, dynamometer 250 may be coupled to a fixture (not shown) that holds workpiece 218 substantially stationary during operation of cavitation peening system 200.

Oxygen sensor 252 is submerged within fluid 216 in feed tank 214, and measures an amount of oxygen dissolved in fluid 216. Without being bound by any particular theory, oxygen dissolved in fluid 216 acts as a nucleation site (not shown) for the formation of cavitation bubbles 220. As such, it is generally easier to form cavitation bubbles 220 when the amount of oxygen dissolved in fluid 216 is outside a predetermined range. Conversely, in one implementation, oxygen sensor 252 facilitates providing an indication that fluid 216 in fluid reservoir 202 should be replaced when the amount of oxygen dissolved in fluid 216 is less than a predetermined threshold.

In one embodiment, visual feedback device 253 may be embodied as a particle image velocimetry device or a Planar Laser Induced Fluorescence device, for example, that captures a plurality of rapid exposure images during operation of cavitation peening system 200. Specifically, visual feedback device 253 faces fluid nozzle 234 and captures the plurality of rapid exposure images of a flow field 254 discharged from fluid nozzle 234. The rapid exposure images facilitate developing a three-dimensional rendering of flow field 254, which is used to verify formation of cavitation bubbles 220 in fluid 216. The three-dimensional rendering is also used to determine cavitation bubble density, flow field size, shape, and location, and flow field coverage verification and/or determination. The formation of cavitation bubbles 220 may be verified either manually or automatically with software implemented by processor 260.

Feedback system 206 also includes a controller 256 in communication, either wired or wirelessly, with feedback devices 242. Controller 256 includes a memory 258 (i.e., a non-transitory computer-readable medium) and a processor 260 coupled to memory 258 for executing programmed instructions. Processor 260 may include one or more processing units (e.g., in a multi-core configuration) and/or include a cryptographic accelerator (not shown). Controller 256 is programmable to perform one or more operations described herein by programming memory 258 and/or processor 260. For example, processor 260 may be programmed by encoding an operation as executable instructions and providing the executable instructions in memory 258.

Processor 260 may include, but is not limited to, a general purpose central processing unit (CPU), a microcontroller, a reduced instruction set computer (RISC) processor, an open media application platform (OMAP), an application specific integrated circuit (ASIC), a programmable logic circuit (PLC), and/or any other circuit or processor capable of executing the functions described herein. The methods described herein may be encoded as executable instructions embodied in a computer-readable medium including, without limitation, a storage device and/or a memory device. Such instructions, when executed by processor 260, cause processor 260 to perform at least a portion of the functions described herein. The above examples are exemplary only, and thus are not intended to limit in any way the definition and/or meaning of the term processor.

Memory 258 is one or more devices that enable information such as executable instructions and/or other data to be stored and retrieved. Memory 258 may include one or more computer-readable media, such as, without limitation, dynamic random access memory (DRAM), synchronous dynamic random access memory (SDRAM), static random access memory (SRAM), a solid state disk, and/or a hard disk. Memory 258 may be configured to store, without limitation, executable instructions, operating systems, applications, resources, installation scripts and/or any other type of data suitable for use with the methods and systems described herein.

Instructions for operating systems and applications are located in a functional form on non-transitory memory 258 for execution by processor 260 to perform one or more of the processes described herein. These instructions in the different implementations may be embodied on different physical or tangible computer-readable media, such as memory 258 or another memory, such as a computer-readable media (not shown), which may include, without limitation, a flash drive and/or thumb drive. Further, instructions may be located in a functional form on non-transitory computer-readable media, which may include, without limitation, smart-media (SM) memory, compact flash (CF) memory, secure digital (SD) memory, memory stick (MS) memory, multimedia card (MMC) memory, embedded-multimedia card (e-MMC), and micro-drive memory. The computer-readable media may be selectively insertable and/or removable from controller 256 to permit access and/or execution by processor 260. In an alternative implementation, the computer-readable media is not removable.

In operation, controller 256 receives a value of at least one feedback parameter from at least one feedback device 242, and determines a peening intensity of the plurality of cavitation bubbles 220 based at least partially on the value of the feedback parameter. More specifically, controller 256 compares the value of the feedback parameter to a predetermined range, such as a range of values, for the feedback parameter stored in memory 258. Controller 256 then verifies that a predetermined amount of compressive residual stress has been imparted to workpiece 218 when the value of the feedback parameter is within the predetermined range. In one implementation, fluid nozzle 234 discharges fluid towards workpiece 218 for a predetermined duration, and one or more feedback devices 242 monitor respective feedback parameters throughout the predetermined duration. Controller 256 then compares the values of each feedback parameter measured over the predetermined duration to each predetermined range to determine the peening intensity, and to determine whether a predetermined amount of compressive residual stress was imparted to workpiece 218 during the predetermined duration.

In another implementation, controller 256 is also in communication with fluid delivery system 204 and facilitates providing substantially continuous feedback, which may or may not be provided in real-time, from feedback devices 242 as fluid nozzle 234 discharges fluid towards workpiece 218. Specifically, controller 256 is in communication with a flow regulator 262 and a pressure regulator 264 that are each coupled along fluid delivery conduit 236. Flow regulator 262, pressure regulator 264, and chiller 224 facilitate controlling the flow of fluid being discharged from fluid nozzle 234. In one embodiment, flow regulator 262 and pressure regulator 264 are advanced digital regulators and/or controllers. Controller 256 is in communication with at least one of flow regulator 262, pressure regulator 264, or chiller 224 to facilitate modifying at least one of the flow rate, the pressure, or the temperature of the fluid discharged from fluid nozzle 234. The flow rate and/or the pressure are modified based on whether a value of a feedback parameter is within a predetermined range. As such, controller 256 ensures a predetermined peening intensity is substantially maintained throughout operation of cavitation peening system 200.

The predetermined threshold values and/or ranges for each feedback parameter are selected to ensure a predetermined amount of compressive residual stress is imparted to workpiece 218. In some implementations, the predetermined threshold values and/or ranges for each feedback parameter used to determine a peening intensity are selected based on a type of material used to fabricate workpiece 218 and/or a type of cavitation peening procedure being implemented (i.e., fluid nozzle 234 having submerged or co-flow configurations). For example, controller 256 compares values of the feedback parameters to first predetermined threshold ranges when workpiece 218 is fabricated from a first material, and controller 256 compares values of the feedback parameters to second predetermined threshold ranges when workpiece 218 is fabricated from a second material different from the first material. As such, controller 256 compares values of the feedback parameters to different predetermined threshold ranges based at least partially on the material used to fabricate workpiece 218 and/or the type of cavitation peening procedure being implemented (e.g., the formation of parts into a predetermined shape).

Figure 5:
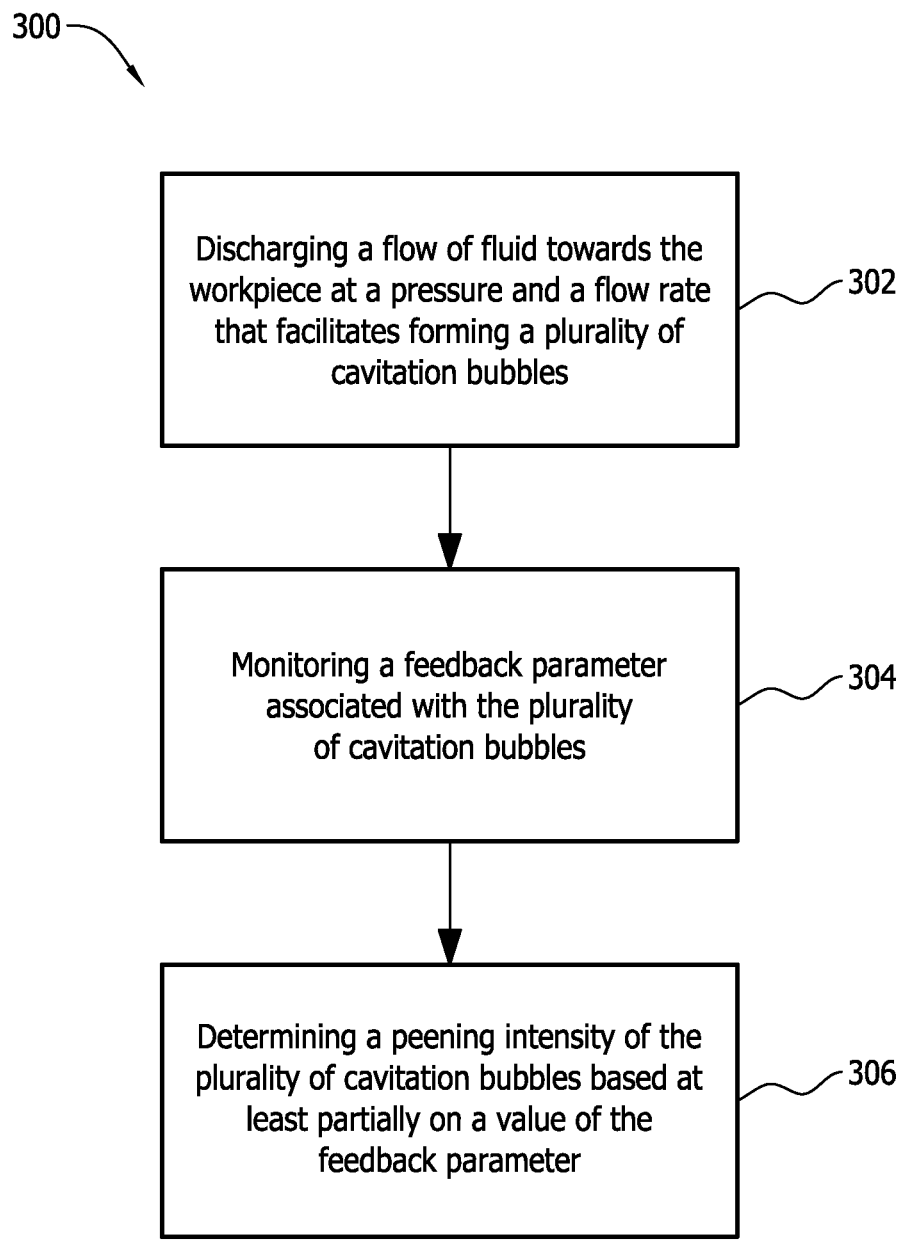
FIG. 5 is a flow diagram illustrating an exemplary method of cavitation peening a workpiece.

FIG. 5 is a flow diagram illustrating an exemplary method 300 of cavitation peening a workpiece, such as workpiece 218. Method 300 includes discharging 302 a flow of fluid towards workpiece 218 at a pressure and a flow rate that facilitates forming a plurality of cavitation bubbles, such as cavitation bubbles 220. Method 300 also includes monitoring 304 a feedback parameter associated with the plurality of cavitation bubbles, and determining 306 a peening intensity of the plurality of cavitation bubbles based at least partially on a value of the feedback parameter.

Determining 306 a peening intensity also includes comparing the value of the feedback parameter to a predetermined threshold range, and verifying a predetermined amount of compressive residual stress has been imparted to the workpiece when the value of the feedback parameter is within the predetermined threshold range. Method 300 also includes selecting the predetermined threshold range based at least partially on a type of material used to fabricate the workpiece.

Discharging 302 a flow of fluid includes discharging the flow of fluid for a predetermined duration, wherein the peening intensity is determined 306 after the predetermined duration has expired. Discharging 302 also includes modifying at least one of the pressure or the flow rate of the flow of fluid based on whether the value of the feedback parameter is within a predetermined threshold range. Monitoring 304 at least one feedback parameter includes monitoring at least one of a sound level, a noise frequency, a vibration frequency, an amount of force in three dimensions, water temperature, an amount of oxygen, or visual feedback such as a cavitation bubble density within the cloud or an individual or average cavitation bubble size. Monitoring 304 also facilitates providing data regarding a telemetry traveled by nozzle 234 relative to workpiece 218, and facilitates analyzing the data to ensure a predetermined amount of workpiece 218 has been treated.

The implementations described herein relate to a cavitation peening system that implements a robust process monitoring and control system to ensure predetermined amounts of compressive residual stress and surface enhancement are provided to peened workpieces. The process monitoring and control system receives feedback from a variety of feedback devices, wherein the feedback is indicative of the formation and/or collapse of cavitation bubbles produced by the cavitation peening system. The feedback is then used to determine a peening intensity of the cavitation bubbles, to control a flow rate and/or pressure of a flow of fluid discharged from a fluid nozzle to produce the cavitation bubbles, and to verify the predetermined amounts of compressive residual stress and surface enhancement are provided to the peened workpieces. The cavitation peening system can then be used to form metallic structures into predetermined shapes such as modifying a contour, straightening, or reducing distortions of the metallic structures, for example. As such, the cavitation peening system described herein provides an easily repeatable, cost-efficient, and time-reducing process for use in peening a workpiece.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of cavitation peening a workpiece, said method comprising:
   discharging a flow of fluid towards the workpiece at a pressure and a flow rate that facilitates forming a plurality of cavitation bubbles;
   monitoring a feedback parameter associated with the plurality of cavitation bubbles; and
   determining a peening intensity of the plurality of cavitation bubbles based at least partially on a value of the feedback parameter.

2. The method in accordance with claim 1, wherein determining a peening intensity comprises comparing the value of the feedback parameter to a predetermined threshold range.

3. The method in accordance with claim 2, wherein comparing the value of the feedback parameter comprises verifying a predetermined amount of compressive residual stress has been imparted to the workpiece when the value of the feedback parameter is within the predetermined threshold range.

4. The method in accordance with claim 1 further comprising determining a flow field coverage of the flow of fluid against the workpiece.

5. The method in accordance with claim 1, wherein discharging a flow of fluid comprises discharging the flow of fluid for a predetermined duration, wherein the peening intensity is determined after the predetermined duration has expired.

6. The method in accordance with claim 1, wherein discharging a flow of fluid comprises modifying at least one of the pressure, the flow rate, or a temperature of the flow of fluid based on whether the value of the feedback parameter is within a predetermined threshold range.

7. The method in accordance with claim 1, wherein monitoring at least one feedback parameter comprises monitoring at least one of a sound level, a noise frequency, a vibration frequency, an amount of force, an amount of oxygen, a temperature, a telemetry traveled by a nozzle that discharges the flow of fluid, or visual feedback.

8. A cavitation peening system for use in peening a workpiece comprising:
   a fluid delivery system comprising a fluid nozzle configured to discharge a flow of fluid therefrom, wherein the flow of fluid is discharged at a pressure and a flow rate that facilitates forming a plurality of cavitation bubbles to be directed towards the workpiece; and
   a feedback system comprising:
      at least one feedback device configured to monitor a feedback parameter associated with the plurality of cavitation bubbles; and
      a controller in communication with said at least one feedback device, said controller configured to:
         receive a value of the feedback parameter from said at least one feedback device; and
         determine a peening intensity of the plurality of cavitation bubbles based at least partially on the value of the feedback parameter.

9. The cavitation peening system in accordance with claim 8, wherein said controller is further configured to compare the value of the feedback parameter to a predetermined threshold range to determine the peening intensity.

10. The cavitation peening system in accordance with claim 9, wherein said controller is further configured to select the predetermined threshold range based at least partially on a type of material used to fabricate the workpiece.

11. The cavitation peening system in accordance with claim 9, wherein said controller is further configured to select the predetermined threshold range based at least partially on a configuration of said fluid nozzle.

12. The cavitation peening system in accordance with claim 8, wherein said controller is further configured to:
   receive a plurality of values of the feedback parameter measured by said at least one feedback device over a predetermined duration; and
   determine the peening intensity after the predetermined duration has expired.

13. The cavitation peening system in accordance with claim 8, wherein said controller is in communication with said fluid delivery system and is configured to modify at least one of the pressure or the flow rate of the flow of fluid based on whether the value of the feedback parameter is within a predetermined threshold range.

14. The cavitation peening system in accordance with claim 13, wherein said controller is further configured to modify the at least one of the pressure, the flow rate, or a temperature of the flow of fluid as the flow of fluid is discharged from said fluid nozzle.

15. The cavitation peening system in accordance with claim 8, wherein said at least one feedback device is configured to monitor as least one of a sound level, a noise frequency, a vibration frequency, an amount of force, an amount of oxygen, a temperature, a telemetry traveled by said fluid, or visual feedback.

16. A feedback system for use with a cavitation peening system, said feedback system comprising:
   at least one feedback device configured to monitor a feedback parameter associated with a plurality of cavitation bubbles formed by the cavitation peening system; and
   a controller in communication with said at least one feedback device, said controller configured to:
      receive a value of the feedback parameter from said at least one feedback device; and
      determine a peening intensity of the plurality of cavitation bubbles based at least partially on the value of the feedback parameter.

17. The feedback system in accordance with claim 16, wherein said controller is further configured to compare the value of the feedback parameter to a predetermined threshold range to determine the peening intensity.

18. The feedback system in accordance with claim 16, wherein said controller is further configured to:
   receive a plurality of values of the feedback parameter measured by said at least one feedback device over a predetermined duration; and
   determine the peening intensity after the predetermined duration has expired.

19. The feedback system in accordance with claim 16, wherein said controller is in communication with a fluid delivery system and is configured to modify at least one of a pressure or a flow rate of a flow of fluid based on whether the value of the feedback parameter is within a predetermined threshold range.

20. The feedback system in accordance with claim 16, wherein said at least one feedback device is configured to monitor as least one of a sound level, a noise frequency, a vibration frequency, an amount of force, an amount of oxygen, a telemetry traveled by a nozzle that facilitates forming the plurality of cavitation bubbles, or visual feedback.

* * * * *